United States Patent
Deng et al.

(10) Patent No.: US 11,544,596 B2
(45) Date of Patent: Jan. 3, 2023

(54) CREATING A MACHINE LEARNING MODEL WITH K-MEANS CLUSTERING

(71) Applicant: Google LLC, Mountain View, CA (US)

(72) Inventors: Mingge Deng, Mountain View, CA (US); Amir H. Hormati, Kirkland, WA (US); Xi Cheng, Mountain View, CA (US)

(73) Assignee: Google LLC, Mountain View, CA (US)

( * ) Notice: Subject to any disclaimer, the term of this patent is extended or adjusted under 35 U.S.C. 154(b) by 337 days.

(21) Appl. No.: 16/843,371

(22) Filed: Apr. 8, 2020

(65) Prior Publication Data

US 2020/0320413 A1 Oct. 8, 2020

Related U.S. Application Data

(60) Provisional application No. 62/831,031, filed on Apr. 8, 2019.

(51) Int. Cl.
| | |
|---|---|
| *G06F 17/00* | (2019.01) |
| *G06N 5/04* | (2006.01) |
| *G06N 20/00* | (2019.01) |
| *G06F 7/14* | (2006.01) |
| *G06F 16/29* | (2019.01) |

(52) U.S. Cl.
CPC ............... *G06N 5/04* (2013.01); *G06F 7/14* (2013.01); *G06F 16/29* (2019.01); *G06N 20/00* (2019.01)

(58) Field of Classification Search
CPC .......... G06N 5/04; G06N 20/00; G06F 16/29; G06F 7/14

USPC .......................................................... 706/12
See application file for complete search history.

(56) References Cited

U.S. PATENT DOCUMENTS

| | | | | |
|---|---|---|---|---|
| 8,676,799 | B1 * | 3/2014 | Vaver ................... | G06V 20/176 707/736 |
| 9,465,857 | B1 * | 10/2016 | DeLand ................ | G06F 16/285 |
| 2013/0016106 | A1 * | 1/2013 | Yip ...................... | G09B 29/006 345/440 |
| 2014/0046895 | A1 * | 2/2014 | Sowani .............. | G06Q 30/0202 707/E17.089 |
| 2015/0193548 | A1 * | 7/2015 | Nice ..................... | G06F 16/283 707/756 |
| 2016/0050536 | A1 * | 2/2016 | You .......................... | G06F 16/29 455/456.3 |
| 2017/0212992 | A1 * | 7/2017 | Pah ..................... | G06Q 30/0205 |
| 2018/0025072 | A1 * | 1/2018 | Fujimaki ................ | G06N 20/00 707/738 |
| 2018/0218378 | A1 * | 8/2018 | Kukade .............. | G06Q 30/0201 |

* cited by examiner

*Primary Examiner* — Pavan Mamillapalli
(74) *Attorney, Agent, or Firm* — Honigman LLP; Brett A. Krueger

(57) ABSTRACT

Methods, systems, and apparatus, including computer programs encoded on a computer storage medium, that creates a machine learning model with k-means clustering. In some implementations, an instruction to create a model is obtained. A data set including geographic data and non-geographic data is received. The data set includes multiple data entries. Geographic centroids are determined from the geographic data. The data set is analyzed to obtain statistics of the data set. Transformed data is generated from the data set, the statistics, and the geographic centroids. A model is generated with the transformed data, the model indicating multiple data groupings.

18 Claims, 7 Drawing Sheets

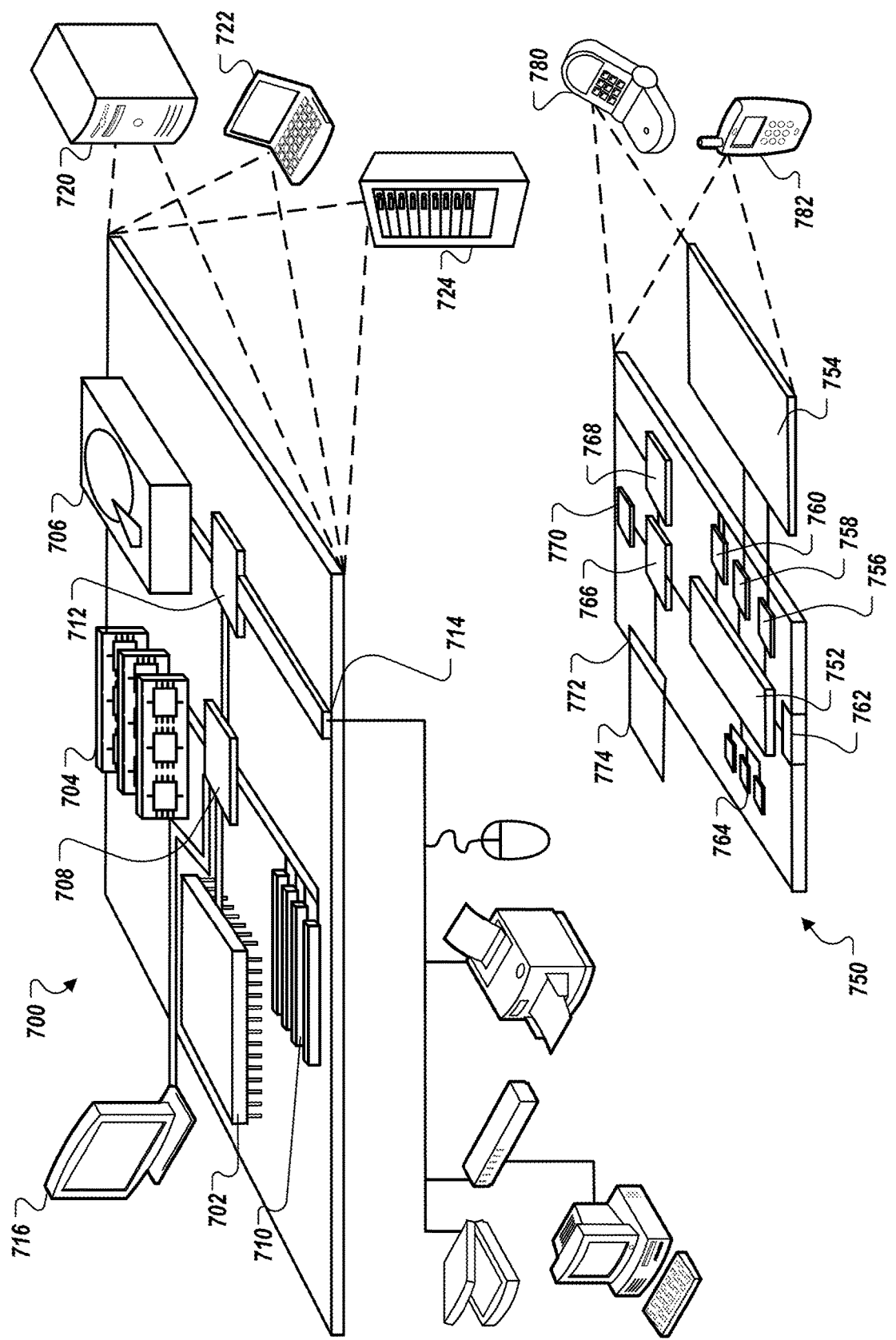

CREATING A MACHINE LEARNING MODEL WITH K-MEANS CLUSTERING

CROSS-REFERENCE TO RELATED APPLICATION

This application claims the benefit of U.S. Application No. 62/831,031, filed Apr. 8, 2019, which is incorporated by reference.

TECHNICAL FIELD

This specification generally relates to machine learning techniques.

BACKGROUND

Machine learning may use training data to train models that can be used to make predictions.

SUMMARY

This document describes techniques, methods, systems, and other mechanisms for performing in-database large-scale k-means clustering for mixed numerical, categorical and geographical features. Models that may be created with machine learning may include linear regression models that may be used for predicting a numerical value, binary logistic regression models that may be used for predicting one of two classes (such as identifying whether an email is spam), and multi-class logistic regression for classification models that may be used to predict more than two classes such as whether an input is "low-value", "medium-value", or "high-value".

Using k-means clustering for creating a machine learning model may enable a user to specify training data, a number of clusters to cluster the training data into, and a maximum number of iterations to perform clustering of the training data, and then have a system create a model that classifies prediction data into particular clusters. For example, rows of training data may be clustered into three different clusters, a model may be generated from the clusters, and the model may then classify each row of prediction data into one of the clusters. Generally, k-means clustering may be a method of vector quantization that partitions n observations into k clusters in which each observation belongs to the cluster with the nearest mean, serving as a prototype of the cluster. This may result in a partitioning of the data space into Voronoi cells.

The k-means models may be created with machine learning in a Structured Query Language (SQL) based system that may receive SQL queries and process stored data using the queries. For example, a SQL engine may receive a single SQL query that specifies a k-means model be created based on clustering training data into five different clusters with a maximum of ten iterations.

This document also describes techniques, methods, systems, and other mechanisms for creating a large scale machine learning model with k-means clustering in a database while supporting geography features. Location information, as captured in the geography features, is common in data sets and may be critical to understanding the data set, e.g., may be critical to an analysis of the data set. Accordingly, incorporating geography features into the machine learning model with k-means clustering may help generate a more viable and accurate machine learning model. In turn, the resulting machine learning model may be used to produce more viable and accurate results for a given data input that includes geography features.

The process of performing k-means clustering to create a machine learning model may include pre-processing support for geography features in data, e.g., a system may perform pre-processing of GEOGRAPHY data type which is a native data type in GoogleSQL language. The system may add the corresponding geography features of the data to the machine learning model created using k-means clustering. The system may compute the distance between the geography feature points. The system may mix numerical and categorical features of the data, e.g., if the data includes both numerical and categorical features. The system may mix the numerical and categorical features in such a way so as to avoid over-emphasizing any particular type of feature. In mixing the numerical and categorical features, the system may standardize the numerical and/or categorical features. The system may proceed to mix the geography feature distance with the numerical and categorical feature distance, e.g., for each data entry of the data. The resulting cumulative distance may be used during k-means clustering to assign data entries to data clusters.

One innovative aspect of the subject matter described in this specification is embodied in methods that include the actions of obtaining an instruction to create a k-means type model with training data, generating an initial table based on the training data, generating an intermediate table based on clustering rows in the training data iteratively based on the initial table by expressing a classic k-means algorithm in SQL language or fitting into database execution plan, and generating the k-means type model based on a pivot operation on the intermediate table.

Another innovative aspect of the subject matter described in this specification includes using geography features during k-means clustering to generate a machine learning model. Geography features is substantially different from numerical and categorical features in that, for example, the process for standardizing geography features and determining a Euclidean distance between geography features points (e.g., during k-means clustering) differs significantly from that of numerical and categorical features. To address this, the geography features may be analyzed to obtain statistics corresponding to the geography features. These statistics may be used to standardize the geography features. Once standardized, a Euclidean distance may be calculated during k-means clustering that includes a component for geographical features of the underlying data in addition to, for example, components for numerical features and categorical features of the underlying data. The resulting machine learning model is therefore generated using geographic data. When implemented, the model may make use of the geographical features found in input data that it receives. Accordingly, the machine learning model may make use of more data in addition to a different type of data. The machine learning model therefore has increased viability and may produce more accurate and useful results.

Although this application is described in the context of SQL, this application is applicable to various types of relational databases including those that may use programming languages other than SQL.

In one general aspect, a method includes: obtaining an instruction to create a model; receiving a data set including geographic data and non-geographic data, the data set having multiple data entries; determining geographic centroids from the geographic data; analyzing the data set to obtain statistics of the data set; generating transformed data from the data set, the statistics, and the geographic centroids; and generating a model with the transformed data, the model indicating multiple data groupings.

Implementations may include one or more of the following features. For example, in some implementations, the non-geographic data includes at least one of numerical data and categorical data.

In some implementations, the method includes: receiving a second data set that includes second data entries; and using the model to assign the second data entries of the second data set to the data groupings.

In some implementations, the method includes: generating a merged data set from the data set and the second data set; determining geographic centroids from geographic data in the merged data set; analyzing the merged data set to obtain statistics of the merged data set; generating updated transformed data from the merged data set, the statistics, and the geographic centroids; and generating an updated model with the updated transformed data, the updated model indicating multiple data groupings, where one or more of the geographic centroids from the geographic data in the merged data set is different from one or more of the geographic centroids from the geographic data in the data set.

In some implementations, determining the geographic centroids from the geographic data in the data set includes: obtaining locations for a subset of the data entries from the geographic data, the subset including data entries in the data set having a geographic data component; and determining single-point positions from the locations, where the geographic centroids are the single-point positions.

In some implementations, obtaining the locations includes obtaining a geographic area for a data entry in the subset, determining the single-point positions from the locations includes determining a geometric center of the geographic area, and the single-point positions include the geometric center for the geographic area.

In some implementations, obtaining the locations includes obtaining coordinates for a data entry in the subset, determining the single-point positions from the locations includes converting the coordinates to a single-point position for the data entry or using the coordinates as the single-point position, and the single-point positions include the single-point position for the data entry.

In some implementations, analyzing the data set to obtain statistics of the data set includes: determining an overall centroid of the geographic data; determining an overall geographic distance of the geographic centroids from the overall centroid; and determining a variance for the geographic data.

In some implementations, determining the overall centroid includes determining a geometric center of the geographic centroids, and the overall centroid is the geometric center of the geographic centroids.

In some implementations, determining the overall geographic distance of the geographic centroids from the overall centroid includes: determining geographic distances of the geographic centroids from the overall centroid; and averaging the geographic distances to obtain the overall geographic distance.

In some implementations, determining the variance for the geographic data includes determining a variance of the geographic distances using differences between the geographic distances and the overall geographic distance.

In some implementations, the overall geographic distance and the geographic distances are geodesic distances along a surface of the earth.

In some implementations, generating the transformed geographic data from the data set, the statistics, and the geographic centroids includes: for a first subset of the data entries, adding the geographic centroids to corresponding data entries of the transformed data as at least a portion of the transformed data; and for a second subset of the data entries, adding the overall centroid to corresponding data entries of the transformed data as at least a portion of the transformed data, where the first subset includes data entries in the data set having a geographic data component and the second subset includes data entries in the data set that do not have the geographic component.

In some implementations, generating the model with the transformed data includes: determining a number of data groupings; assigning positions to the data groupings; and assigning data entries of the transformed data to the nearest data grouping using the positions, where assigning the data entries of the transformed data to the nearest data grouping includes: determining total Euclidean distances between the data entries and the positions, where determining the total Euclidean distances between the data entries and the positions includes: determining Euclidean distances for transformed non-geographic data in the transformed data from each of the positions; determining Euclidean distances for transformed geographic data in the transformed data from each of the positions; and aggregating the Euclidean distances for the transformed non-geographic data and the Euclidean distances for the transformed geographic data to obtain the total Euclidean distances, comparing the total Euclidean distances to identify the positions that are nearest the data entries of the transformed data; and based on the comparison, assigning the data entries of the transformed data to the data groupings corresponding to the positions that are nearest the data entries of the transformed data.

In some implementations, determining the Euclidean distances for the transformed non-geographic data from each of the positions includes: determining Euclidean distances for numerical data components in the transformed non-geographic data from each of the positions; and determining Euclidean distances for categorical data components in the transformed non-geographic data from each of the positions, where aggregating the Euclidean distances includes aggregating the Euclidean distances for the numerical data components, the Euclidean distances for the categorical data components, and the Euclidean distances for the transformed geographic data to obtain the total Euclidean distances.

In some implementations, determining the Euclidean distances for the transformed geographic data from each of the positions includes: determining geographic distances between the geographic centroids and each of the positions; using the statistics to identify a variance of the geographic data; and using the variance to standardize the geographic distances, where the Euclidean distances for the transformed geographic data include the standardized geographic distances.

In some implementations, generating the model with the transformed data includes determining new positions for the data groupings by: for each of the data groupings, determining a geometric center for data entries of the transformed data assigned to the respective data grouping; and assigning the geometric centers to the data groupings as the new positions, where determining the geometric center includes: averaging the Euclidean distances for transformed non-geographic data in the transformed data corresponding to the data entries of the transformed data assigned to the respective data grouping; and averaging the Euclidean distances for transformed geographic data in the transformed data corresponding to the data entries of the transformed data assigned to the respective data grouping.

In some implementations, generating the model with the transformed data includes determining an accuracy of the model by: determining that differences between the new positions and the positions meet a first threshold, or determining that an average quantization error for the data entries of the transformed data assigned to the data groupings at the new positions meet a second threshold.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Details of one or more implementations are set forth in the accompanying drawings and the description below. Other features, objects, and advantages will be apparent from the description and drawings, and from the claims.

DESCRIPTION OF DRAWINGS

FIG. 7 is a block diagram of computing devices that may be used to implement the systems and methods described in this document, as either a client or as a server or plurality of servers.

Like reference symbols in the various drawings indicate like elements.

DETAILED DESCRIPTION

Figure 1:
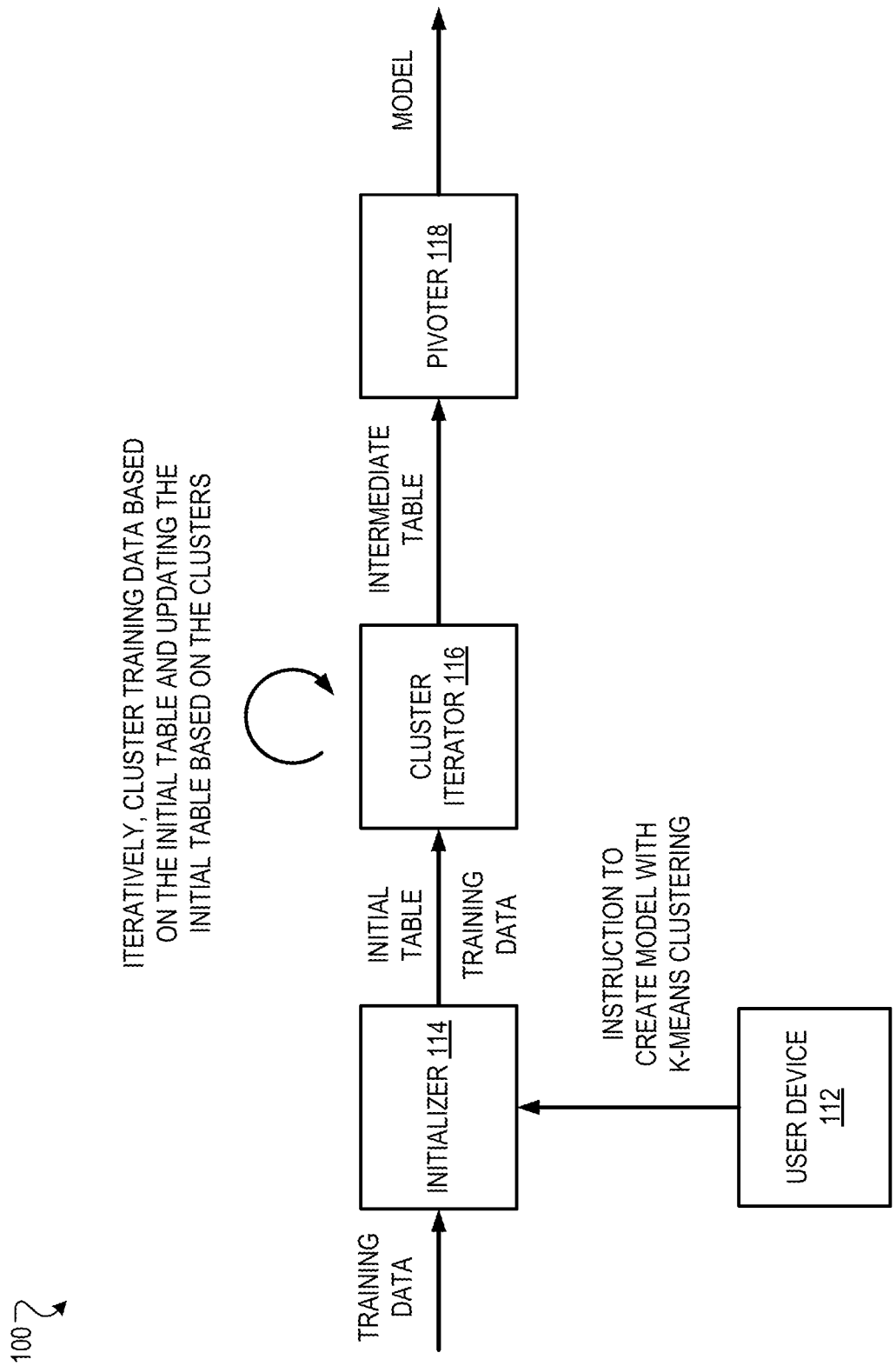
FIG. 1 is a block diagram of an example system that performs transformation for creating a machine learning model with k-means clustering.

FIG. 1 is a block diagram of an example system 100 that performs transformation for creating a machine learning model with k-means clustering. The example system 100 may be a Structured Query Language (SQL) based system. For example, the system 100 may receive SQL queries from users and process data stored in tables in the system 100 based on the SQL queries.

Briefly, the system 100 includes an initializer 114 that obtains training data and an instruction from a user device 112, and that initializes a table that is used to create a model, a cluster iterator 116 that obtains the initial table and the training data and iteratively clusters training data based on the initial table and updates the initial table based on the clusters, and a pivoter 118 that receives the intermediate table and performs a pivot operation on the intermediate table and uses the output of the pivot operation as the model.

The user device 112 may be a computing device used by a user to input an instruction to create a k-means type machine learning model. For example, a user may provide a SQL query of "CREATE MODEL my_model OPTIONS (model_type='kmeans', num_clusters=3, max_iterations=20, dist_type='euclidean') AS SELECT*FROM data" that may be an instruction to create a k-means type machine learning model based on taking training data in the table named "data" and clustering that data into three clusters and performing a maximum number of twenty clustering iterations.

The initializer 114 may obtain the instruction from the user device 112, obtain the training data specified by the instruction, and generate an initial table based on the training data. For example, the initializer 114 may receive the above SQL query from the user device 112, in response, retrieve the training data from the table named "data," and generate, based on the training data, an initial table that represents an initial model that clusters input into three clusters.

The cluster iterator 116 may obtain the initial table and the training data and iteratively update cluster the training data based on the initial table and update the initial table based on the clusters. For example, the cluster iterator 116 may cluster the rows of the training data into three clusters based on the centroids for each cluster specified by the initial table, update the centroids specified by the initial table based on the rows in each cluster, and iterate until either the maximum number of iterations specified by the instruction has been reached or the rows in the clusters are unchanged during an iteration, whichever comes first.

The cluster iterator 116 may generate an intermediate table based on a result of the iterations of clustering. For example, once the iterations are finished, the initial table may be the intermediate table and the cluster iterator 116 may output the initial table.

The pivoter 118 may obtain the intermediate table and perform a pivot operation on the intermediate table, and the output of the pivot operation may be the model. For example, the pivoter 118 may receive the intermediate table from the cluster iterator 116, and output as a k-means type model the output of pivoting the intermediate table. The model may then be called upon to cluster prediction data into the clusters. For example, another SQL query may instruct that the model receives prediction data as input, and the model may then provide output that includes a prediction of a cluster for each of the rows of the prediction data. In some implementations, the pivoter 118 may return the model as output to the user device 112.

In some implementations, the initializer 114, the cluster iterator 116, and the pivoter 118 may be implemented on separate computing devices, respectively, or on the same computing device. For example, the initializer 114 may be implemented on a first server, the cluster iterator 116 may be implemented on a second server, and the pivoter 118 may be implemented on a third server. In another example, the initializer 114, the cluster iterator 116, and the pivoter 118 may all be implemented on the user device 112.

Figure 2:
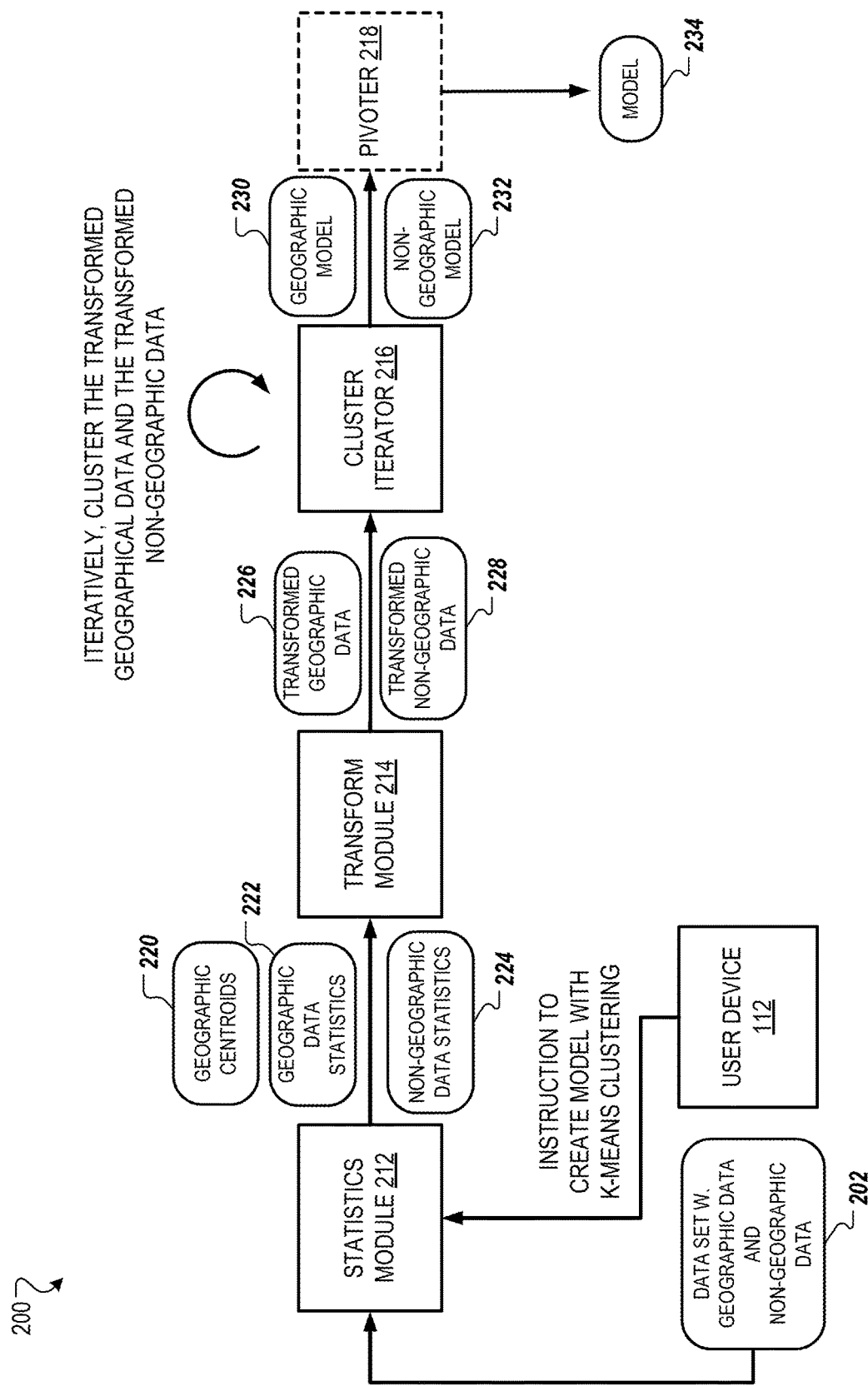
FIG. 2 is a block diagram of an example system for creating a machine learning model with k-means clustering while supporting geography features in addition to non-geography (i.e., numerical and categorical features).

FIG. 2 is a block diagram of an example system 200 for creating a machine learning model with k-means clustering while supporting geography features. In some implementations, the system 200 is the system 100 described above with respect to FIG. 1.

The system 200 includes a statistics module 212, a transform module 214, and a cluster iterator 216. The system 200 optionally includes a pivoter 218. In some implementations, the statistics module 212 and the transform module 214 are a part of the initializer 114 shown in FIG. 1. In some implementations, the statistics module 212 and the transform module 214 make up the initializer 114. In some implementations, the cluster iterator 216 is the cluster iterator 116. In some implementations the pivoter 218 is the pivoter 118.

The statistics module 212, the transform module 214, the cluster iterator 216, and/or the pivoter 218 can be part of one or more computing devices. For example, the statistics module 212 and the transform module 214 can each be a software module running on a server, a desktop computer, a laptop computer, etc.

The statistics module 212 can receive an instruction to create a model with k-means clustering from the user device 112. This instruction can be the same instruction to create a model with k-means clustering as shown in FIG. 1. The instruction can be received directly from the user device 112 or can be received from the user device 112 through an intermediary device such as an SQL server. The instruction can indicate the data set 202 or a portion of the data set 202 that is to be used to generate a machine learning model 234. The model 234 can be the same model that is outputted by the pivoter 118 shown in FIG. 1.

The statistics module 212 can also receive or access (e.g., import) all or a portion of the data set 202. The training data includes geographic data (e.g., data entries having one or more geographic feature columns) and non-geographic data (data entries with one or more non-geographic feature columns).

Geographic data can include geography data types (e.g., location information) such as, for example, a latitude-longitude point corresponding to a point on the surface of the earth, a line corresponding to a series of locations on the surface of the earth or a boundary (e.g., a border between two neighborhoods, between two counties, between a city and a county, between two states, between two countries, etc.), or a polygon corresponding to an area of the surface on earth (e.g., a zip code area, an area drawn by a user, a neighborhood, a county, a city, a state, a country, etc.). For example, the data set 202 can include a column that includes location coordinates such as latitude and longitude degrees for one or more data entries in the data set 202.

The non-geographic data can include, for example, numerical data and/or categorical data. The numerical data can include integer data types, floating point data types, double data types, etc. As an example, the numerical data can correspond to a number of company locations, a number of users or customers, heights of users or customers, weights of users or customers, ages of users or customers, etc. The categorical data can include string data types, boolean data types, etc. As an example, the categorical data can correspond to genders of users or customers, nationalities of users or customers, names of users or customers, company names, etc.

The statistics module 212 can use all or a portion of the data set 202 to generate geographic centroids 220 corresponding to geographic data in the data set 202, statistics 222 of the geographic data in the data set 202, and statistics 224 of non-geographic data in the data set 202. The statistics module 212 can perform preprocessing on the all or a portion of the data set 202 to obtain the geographic data statistics 222, the statistics 224, and/or the geographic centroids 220.

Figure 3:
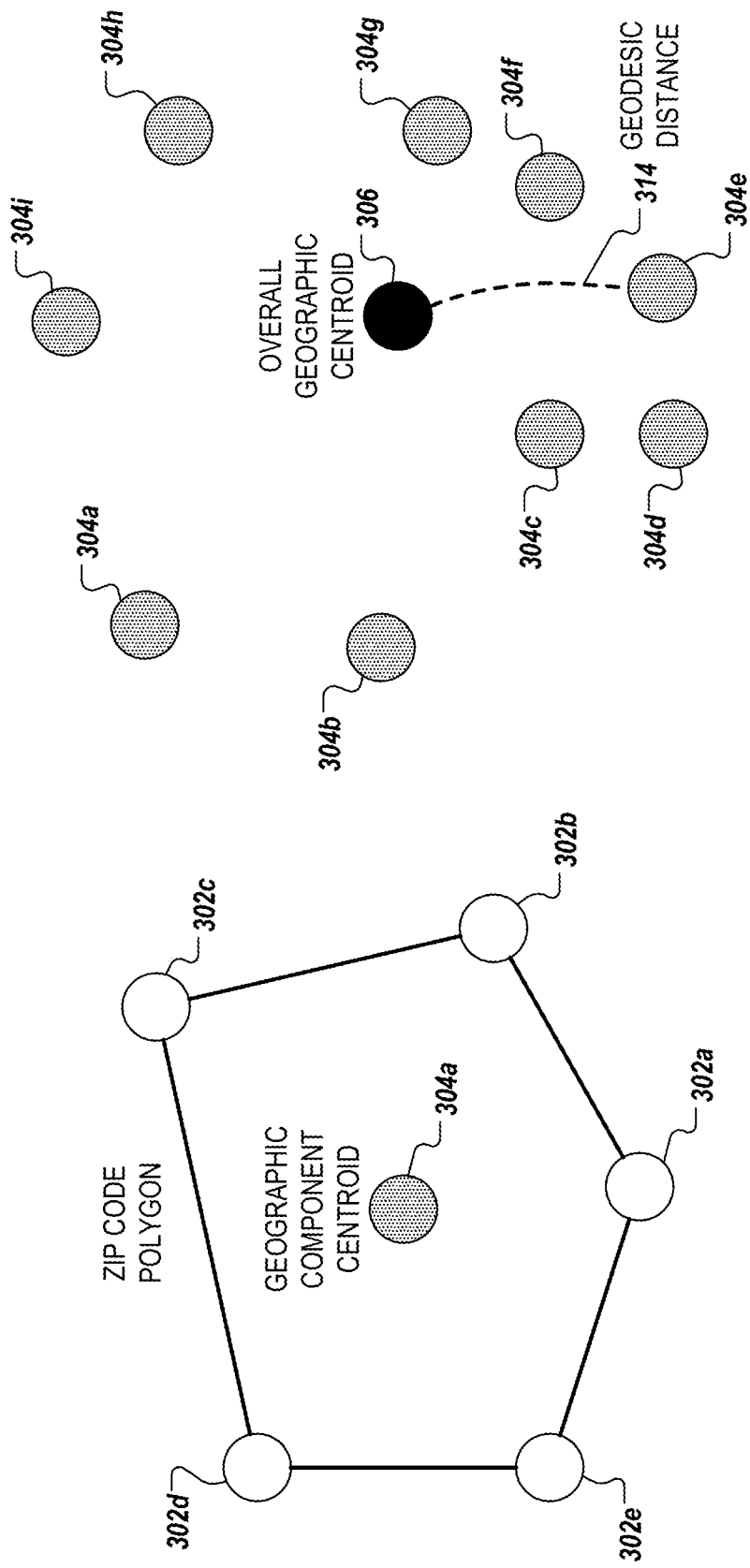
FIGS. 3A-3B are example diagrams for determining centroids of the geography features.

In generating the geographic centroids 220, the statistics module 212 can convert the geographic data in the data set 202 to singlepoint (latitude and longitude) locations (e.g., single-point Geography objects). For example, the statistics module 212 can use the public GoogleSQL function ST_GEOGPOINT(longitude, latitude) to convert coordinates found in the geographic data to a single point.

Where the geography data of the data set 202 includes data entries with multiple location points, e.g., includes data entries with geographic lines or polygons, the statistics module 212 can determine a geographic centroid for each of these data entries. The statistics module 212 can determine a geographic centroid for each of these data entries by calculating a geometric center of the geographic lines or polygons for each data entry. For example, if the data set 202 includes a geographic data column containing zip codes, the statistics module 212 can calculate a geometric center of each of the zip codes. These geometric centers serve as the single points for each of the corresponding data entries and the corresponding column of the geographic data. An example of a geographic centroid for a single data entry is shown in FIG. 3A which is described in more detail below.

The geographic centroids 220 can be the single-point locations determined for the geographic data, e.g., determined for each data entry in the data set 202 having a geographic component. A geographic component can mean that the corresponding data entry includes a value (e.g., not NULL) in a column of geographic data. Accordingly, the geographic centroids 220 can be formed from, for example, single point locations, converted coordinates, geometric centers of multiple single point locations, geometric centers of geographic lines, geometric centers of geographic areas, etc.

In generating the geographic data statistics 222, the statistics module 212 uses the data set 202 to obtain one or more overall geographic centroids for the geography data across all data entries of the data set 202 having a corresponding geographic component, e.g., across all rows having a value in a column of geographic data. An overall centroid can represent the geometric center for the locations in all or part of the geographic data, e.g., the locations found in a column of geographic data of the data set 202. That is, an overall centroid can correspond to a centroid for a column of the data set 202 containing geographic data. The statistics module 212 can determine an overall centroid by, for example, determining the geometric center of all or part of the geographic centroids 220. For example, the statistics module 212 can determine an overall centroid for a column in the data set 202 that includes zip codes by calculating the geometric center of the geographic centroids of the geographic centroids 220 that correspond to the zip codes in the column. If one or more rows of the column of geographic data do not include a value, the statistics module 212 can ignore these rows in determining an overall centroid. An example of an overall centroid of the geography data is shown in FIG. 3B which is described in more detail below. In determining an overall centroid, the statistics module 212 can use the GoogleSQL public function ST_CENTROID. The function ST_CENTROID returns the geometric center of an input set of geography objects.

In generating the geographic data statistics 222, the statistics module 212 can determine one or more average distances for the geography data to the one or more overall centroids, and one or more standard deviations of the distances of the geography data to the one or more overall centroids. For example, the statistics module 212 can calculate an average distance across all rows of the data set 202 for a column containing geography data from the single point locations of the data entries for the column to the determined overall centroid for the column. The statistics module 212 can determine a distance for each data entry having a value in the column from the corresponding single point location to the overall centroid for the column. The statistics module 212 can use these distances to calculate an average distance by, for example taking the mean of the distances, and to calculate a standard deviation of the distances.

The distances calculated by the statistics module 212 can be geodesic distances, e.g., a distance along the surface of the earth. A geodesic distance can be obtained by, for example, multiplying the angle between the two 3D vectors that each correspond to a single point location by the radius of the earth. In determining the distances, the statistics module 212 can use the GoogleSQL public function ST_DISTANCE with the inputs being the corresponding single point locations and the overall centroid for the column. The function ST_DISTANCE can be used to directly compute the distance between two geography objects, such as the single point locations and the geographic centroids. The function ST_DISTANCE generates real geographical distance values, e.g., distances along the surface of the earth.

For example, the following formula can be used to obtain the average distance:

$$\underline{dist} = \frac{1}{N}\sum_{i=0}^{N}(x_i, ST\_CENTROID(\{X\})).$$

Here, X is the set of geographic centroids of the geographic centroids 220 that correspond to, for example, a particular column of geographic data in the data set 202. N represents the number of data entries having a geographic component, for example, for the particular column of geographic data in the data set 202. The function $dist(x_i, ST\_CENTROID(\{X\})) = \sqrt{(x_i - ST\_CENTROID(\{X\}))^2}$. Finally, $\underline{dist}$ is the mean geographic distance of the geographic distances.

Similarly, the following formula can be used to obtain the standard deviation of the distances:

$$\sigma_{dist} = \sqrt{\frac{1}{N}\sum_{i=0}^{N} dist^2(x_i, ST\_CENTROID(\{X\}))}.$$

The standard deviation squared can represent the variance of the mutual geographic distances within a geography feature, e.g., the variance of the distances from the geographic centroids of the geographic centroids 220 corresponding to a column of geographic data to an overall centroid for the column.

The statistics module 212 can generate standardized geographic distances by, for example, dividing the geographic distances determined for a column of geographic data by the corresponding standard deviation. Alternatively, the transform module 214 or the cluster iterator 216 can generate corresponding standardized geographic distances using the geographic data statistics 222.

The statistics module 212 can additionally or alternatively use the following SQL code to obtain the geographic distances:

```
WITH data AS
    (SELECT
        CAST(TRUNC(RAND( ) * 9e18) AS INT64) AS id, geo_col
    FROM
        'training_table'
)
SELECT
        ST_DISTANCE(d1.geo_col, d2.geo_col) as geo_dist
FROM
        data AS d1
CROSS JOIN data AS d2
WHERE d1.id < d2.id
```

Then the mean and stddev of mutual distance can be obtained by AVG(geo_dist) and STDDEV(geo_dist).

After obtaining the distance, e.g., using the function ST_DISTANCE, the statistics module can determine mean and standard deviation by using the GoogleSQL public functions AVG(geo_dist) and STDDEV(geo_dist), respectively.

The statistics module 212 can save the statistics generated for the geographic data including, for example, the one or more overall centroids, the one or more mean distances, and/or the one or more standard deviations.

In generating the non-geographic data statistics 224, the statistics module 212 can analyze the non-geographic data in the data set 202. In analyzing the non-geographic data, the statistics module 212 can determine an average value for numerical data and a standard deviation of numerical data, e.g., for a column of numerical data in the data set 202. The statistics module 212 can use the statistics corresponding to the numerical data to, for example, standardize the numerical. Alternatively, the transform module 214 or the cluster iterator 216 can generate corresponding standardized numerical data using the non-geographic data statistics 224. In analyzing the non-geographic data, the statistics module 212 or the transform module 216 can one-hot encode the categorical data so that the categorical data values are converted into a form that can be provided to ML algorithms, e.g., to be provided to the cluster iterator 216.

In some implementations, the statistics module 212 determines multiple centroids for the geography data. As an example, the statistics module 212 can determine a centroid for each column of the data set 202 that includes geographic data. For example, the data set 202 can include a first column containing geographic points corresponding to the locations where users work, and a second column containing geographic areas corresponding to the zip codes where users live. The statistics module 212 can determine a first centroid for the work location column (the first column) and a second centroid for the zip code column (the second column). As will be described in more detail below, the transform module 214 can add the first centroid to any data entries of the training data that did not include a value in the work location column, and can add the second centroid to any data entries of the training data that did not include a value in the zip code column.

The statistics module 212 can provide the geographic centroids 220, the geographic data statistics 222, and the non-geographic data statistics 224 to the transform module 214.

The transform module 214 can be used to generate transformed geographic data 226 and transformed non-geographic data 228. In generating the transformed geographic data 226 and the transformed non-geographic data 228, the transform module 214 can use the data set 202. In generating the transformed geographic data 226, the transform module 214 can use the geographic centroids 220 and the geographic data statistics 222. In generating the transformed non-geographic data 228, the transform module 214 can use the non-geographic data statistics 224.

In generating the transformed geographic data 226, the transform module 214 can modify the geographic data in the data set 202 such that the geographic data values for data entries are replaced with their corresponding geographic centroids of the geographic centroids 220, e.g., their single-point locations. In generating the transformed geographic data 226, the transform module 214 can add the one or more overall centroids to data entries without one or more geographic data values (e.g., data entries having a NULL value in a geographic data column) as values. As an example, for any data entries that have a NULL value in a geographic data column, the transform module 214 can replace the NULL value with an overall centroid corresponding to the geographic data column. Modifying the geographic data in the data set 202 can include generating new training data from the data set 202 as the transformed geographic data 226 without directly modifying the data set 202. Modifying the geographic data in the data set 202 can include making a copy of the data set 202 and updating the geographic data values in the copy.

In generating the transformed non-geographic data 228, the transform module 214 can modify the non-geographic data in the data set 202 such that the non-geographic data values for data entries are replaced with their corresponding standardized values and/or one-hot encoded forms. For example, the transform module 214 can modify numerical data of the non-geographic data so that it is standardized or is replaced with standardized values. Similarly, the transform module 214 can modify categorical data of the non-geographic data so that it is converted or replaced with its one-hot encoded forms. Modifying the non-geographic data in the data set 202 can include generating new training data from the data set 202 as the transformed non-geographic data 228 without directly modifying the data set 202. Modifying the non-geographic data in the data set 202 can include making a copy of the data set 202 and updating the non-geographic data values in the copy.

The transform module 214 can provide the transformed geographic data 226 and the transformed non-geographic data 228 to the cluster iterator 216. The transformed geographic data 226 and the transformed non-geographic data 228 can be provided together as a training data set, e.g., a training data table. This data set can be updated over time, e.g., with new training data or with data inputs that are later provided to the model 234.

The cluster iterator 216 can perform the same processes described above with respect to the cluster iterator 116 in FIG. 1. The cluster iterator 216 can iteratively cluster the transformed geographical data 226 and the transformed non-geographic data 228. In clustering the transformed data, the cluster iterator 216 can determine a number of clusters (e.g., data groupings) and determine centroids for each of the data groupings. These centroids can be initially chosen at random. Each of the cluster centroids can have a geographic component and one or more non-geographic components. For example, as described in more detail below with respect to FIG. 4, a cluster centroid can include a numerical data component, a categorical data component, and a geographic data component.

The cluster iterator 216 assigns each data entry of the transformed data to a cluster that the data entry is nearest. In assigning each data entry, the cluster iterator calculates Euclidean distances for each data entry from the data entry to each of the cluster positions. The calculation for the Euclidean distances include geographic and non-geographic components. For example, the calculation for the Euclidean distances can include a component for geographic data, a component for numerical data, and a component for categorical data. This calculation can be represented using the following equation:

$$dist_{Euclidean} = \sum_i (x_i - y_i)^2 + \lambda \sum_j (1.0 - \delta(x_j, y_j)) + \frac{1}{\sigma_{dist}^2} \sum_k (ST\_DISTANCE(x_k, y_k)).$$

In this equation, $\Sigma_i(x_i-y_i)^2$ is the calculation component for the numerical data in the transformed non-geographic data 228. Here, $x_i$ can represent a numerical data value for a given data entry found in the transformed non-geographic data 228. For example, $x_i$ can represent a value in the first column of the transformed non-geographic data 228 containing standardized numerical data values. $x_i$ can be iterated for each column of the transformed non-geographic data 228 containing numerical data. Whereas, $y_i$ can represent the numerical component of a cluster centroid. $y_i$ can be iterated for each cluster, e.g., for each cluster centroid.

In the Euclidean distance equation above, $\lambda\Sigma_j(1.0-\delta(x_j, y_j))$ is the calculation component for the categorical data in the transformed non-geographic data 228. Here, $x_j$ can represent a categorical data value (e.g., a categorical data value that is in its one-hot encoded form) for a given data entry found in the transformed non-geographic data 228. For example, $x_j$ can represent a value in a second column of the transformed non-geographic data 228 containing categorical data values that have been one-hot encoded. $x_j$ can be iterated for each column of the transformed non-geographic data 228 containing categorical data. Whereas, $y_j$ can represent the categorical component of a cluster position. $y_j$ can be iterated for each cluster, e.g., for each cluster position. The delta function can be, for example, $\delta(x_j,y_j)=1$ if $x_j=y_j$ and 0 if $x_j \neq y_j$.

The lambda constant can be, for example, $\lambda=1.0$ if the numerical data features in the transformed non-geographic data 228 have been standardized with its mean and variance (e.g., by the transform module 214 using the non-geographic data statistics 224) and categorical data features in the transformed non-geographic data 228 have been one-hot encoded (e.g., by the transform module 214 using the non-geographic data statistics 224). However, if the numerical data features in the transformed non-geographic data 228 are not standardized, then $$\lambda = \left[ \frac{\sigma_{numerical}^2}{3}, \frac{2 * \sigma_{numerical}^2}{3} \right],$$

where $\sigma_{numerical}^2$ is the mean of the variance of all numerical features. $\sigma_{numerical}^2$ can be determined using the numerical data statistics 224. The system 200 can also select $\lambda$ dynamically based on associations made when analyzing the data set 202 and/or based on data later input to the model 234

(e.g., based on who provided the input data, based on the company associated with the input data, etc.).

In the Euclidean distance equation above, $$\frac{1}{\sigma_{dist}^2} \sum_k (\text{ST\_DISTANCE}(x_k, y_k))$$

is the calculation component for the geographic data in the transformed geographic data 226. Here, $x_k$ can represent a geographic data value (e.g., a geographic centroid of the geographic centroids 220) for a given data entry found in the transformed geographic data 228. For example, $x_k$ can represent a geographic centroid in the first column of the transformed geographic data 226 containing geographic data (e.g., single-point locations). $x_k$ can be iterated for each column of the transformed geographic data 226 containing geographic data. Whereas, $y_k$ can represent the geographic component of a cluster position. $y_k$ can be iterated for each cluster, e.g., for each cluster position. The GoogleSQL public ST_DISTANCE function determines the geographic distances between $x_k$ and $y_k$. $\sigma_{dist}^2$ is the variance that can be calculated using the previously determined standard deviation found in the geographic data statistics 222.

Once the cluster iterator 216 has assigned each of the data entries to a particular cluster, the cluster iterator 216 can analyze the data entries in each of the clusters to determine a geometric center of the data entries. This is described in more detail below with respect to FIG. 4. In determining a geometric center for a cluster, the cluster iterator 216 takes into account the geographic data and the non-geographic data corresponding to each of the data entries. The cluster iterator 216 uses the determined geometric centers as the new position for each of the clusters. As described below, the cluster iterator 216 can compare the new cluster positions (e.g., the geometric centers) with the previous cluster positions to determine if another training iteration is necessary. For example, if the new centroids are sufficiently close (e.g., are within a threshold distance) to the previous centroids, the cluster iterator 216 can determine that an additional training iteration is not necessary. However, if the cluster iterator 216 determines that at least one additional iteration is needed, the cluster iterator 216 restarts the assigning process for the data entries in the transformed data with the clusters located at their new positions.

In determining if another iteration is needed, the cluster iterator 216 can compare the new cluster positions with the previous centroids to determine if one or more criteria are met. That is, for example, the cluster iterator 216 can compute convergence criterion. The criterion can be that the differences between old and new positions (e.g., cluster centroids) are less than a threshold. The criterion can additionally or alternatively be that an average quantization error q(C) change is less than a threshold. The average quantization error q(C) can be represented by the following equation: $q(C) = \sum_{i=1}^{n} d(y_i, c_j(y_i))$. In the equation, $c_j(y_i) = \arg\arg d(c, y_i)$ is the nearest cluster position (e.g., cluster centroid) to point $y_i$, and $d(c, y_i)$ is the distance function such as Euclidean distance. For example, $=(y_i - c_j)^T (y_i - c_j)$.

Once the cluster iterator 216 has completed performing model training (e.g., k-means clustering), the cluster iterator 216 can generate and output a geographic model 230 and a non-geographic model 232. In some implementations, the cluster iterator 216 can output a single model, e.g., an unpivoted model. However, this can require more processing as it may require a CROSS JOIN between all non-geographic data features and geographic data features. This can make the single model significantly larger and can require additional processing when compared to generating the geographic model 230 and the non-geographic model 232.

The pivoter 218 can perform the processes of the pivoter 118 described above with respect to FIG. 1. The pivoter 218 can receive the geographic model 230 and the non-geographic model 232. The pivoter 218 can combine both the geographic model 230 and the non-geographic model 232 to generate the model 234 for model evaluation and prediction. Specifically, the pivoter 218 can, for example, pivot the geographic model 230 and the non-geographic model 232 using the clusters, e.g., the geographic model 230 and the non-geographic model 232 can be pivoted using a cluster identification (e.g., "centroid_id" shown below).

The pivoter 218 can combine both the geographic model 230 and the non-geographic model 232 to generate the pivoted model 234 when a prediction request has been received and/or when input data has been imported.

An example table representing the geographical model 230 is provided below:

| centroid_id | f_geography |
| --- | --- |
| 1 | STGeography ("–90:0##") |
| 2 | STGeography ("–90:0##") |

An example table representing the non-geographical model 232 is provided below:

| centroid_id | f_numerical | f_categorical |
| --- | --- | --- |
| 1 | 0.33 | {{'feature' : '_OHE_str:x', 'value' : 0.56}, {'feature' : '_OHE_str:y', 'value' : 0.44}} |
| 2 | 0.74 | {{'feature' : '_OHE_str:x', 'value' : 0.16} {'feature' : '_OHE_str:y', 'value' : 0.84}} |

The pivoter 218 outputs the model 234. An example table representing the model 234 is provided below:

| centroid_id | f_numerical | f_categorical | f_geography |
| --- | --- | --- | --- |
| 1 | 0.33 | {{'feature' : '_OHE_str:x', 'value' : 0.56}, {'feature' : '_OHE_str:y', 'value' : 0.44}} | STGeography ("–90:0##") |
| 2 | 0.74 | {{'feature' : '_OHE_str:x', 'value' : 0.16}, {'feature' : '_OHE_str:y', 'value' : 0.84}} | STGeography ("–90:0##") |

In some implementations, if the data set 202 does not contain geographic data, the cluster iterator 216 can performs k-means clustering by calculating Euclidean distances using only the non-geographic components (e.g., using only the numerical data and categorical data components) or by calculating cosine distances in place of the Euclidean distances.

For example, the following formula can be used to calculate Euclidean distances where the data set 202 does not contain geographic data:

$$dist_{Euclidean} = \Sigma_i(x_i - y_i)^2 + \lambda \Sigma_j(1.0 - \delta(x_j, y_j))$$

Similarly, the following formula can be used to calculate cosine distances for non-geographic data:

$$dist_{Cosine} = 1 - \frac{\sum_i (x_i y_i) + \lambda \sum_j (\delta(x_j, y_j))}{\sqrt{(\sum_i (x_i)^2 + \sum_j \lambda)} \sqrt{(\sum_i (y_i)^2 + \sum_j \lambda)}}$$

A k-means state machine may have several states which manipulate the non-geographic model 232. These states can include the following: (1) initialize_centroids(_from_warm_start); (2) update_centroids; and (3) pivot_model. The first state, initialize_centroids(_from_warm_start), provides for starting model training from an existing model. For example, if a user is training a k-means model and training stops due to a system failure, the user can restart training from an intermediate model that had been generated despite the training having been interrupted. Accordingly, in this example, clustering would not need to restart with assigning the clusters random positions and could, instead, restart clustering with the clusters being assigned the last used positions. The second state, update_centriods, provides for updating the positions of the clusters, e.g., by calculating the geometric center/average value for the data entries assigned to each of the clusters. The third state, pivot_model, provides for pivoting the non-geographic model 232.

Due to the inclusion of geographic data features, the following states can be introduced for the geographic model 230: (1) initialize_geo_centroids(_from_warm_start); (2) update_geo_centriods; (3) pivot_geo_model. The first state, initialize_geo_centroids (_from_warm_start), provides for starting model training from an existing model. For example, if a user is training a k-means model and training stops due to a system failure, the user can restart training from an intermediate model that had been generated despite the training having been interrupted. Accordingly, in this example, clustering would not need to restart with assigning the clusters random positions and could, instead, restart clustering with the clusters being assigned the last used positions. The second state, update_geo_centriods, provides for updating the positions of the clusters, e.g., by calculating the geometric center/average value for the data entries assigned to each of the clusters. The third state, pivot_geo_model, provides for pivoting the geographic model 230.

FIGS. 3A-3B are example diagrams for determining geographic centroids.

FIG. 3A shows determining a geographic component centroid 304a from a zip code polygon of a given data entry. The zip code polygon is defined by single-point locations 302a-302e. The geographic component centroid 304a can be determined by the statistics module 212 shown in FIG. 2 calculating the geometric center of the single-point locations 302a-302e. The geographic component centroid 304a can be included in the geographic centroids 220 shown in FIG. 2.

FIG. 3B shows determining an overall geographic centroid 306 from multiple geographic centroids 304a-304i. As an example, the geographic centroids 304a-304i can be the geographic centroids 220 shown in FIG. 2. Each of the geographic centroids 304a-304i can correspond to a single data entry, e.g., to a particular column of a single data entry. For example, the geographic centroids 304a-304i can each represent a geometric center of a zip code from a column of zip codes in the data set 202. The overall geographic centroid can be determined by the statistics module 212 shown in FIG. 2 calculating the geometric center of the geographic centroids 304a-304i.

The statistics module 212 can proceed to determine the geodesic distances between each of the geographic centroids 304a-304i and the overall geographic centroid 306, such as the geodesic distance 314 between the geographic centroid 304e and the overall geographic centroid 306, in order to, for example, determine the geographic data statistics 222. That is, the statistics module 212 can use the various geodesic distances to determine an average distance of the geographic centroids 304a-304i from the overall geographic centroid 306, and to determine a standard deviation for the geodesic distances.

The transform module 214 can use the overall geographic centroid 306 to, for example, to update data entry values. For example, the transform module 214 can use the overall geographic centroid 306 as a replacement for any NULL values found in a column of zip codes that was used to produce the geographic centroids 304a-304i. Accordingly, the transformed geographic data 226 can, for example, include the same number of entries as the data set 202. For those data entries that had a zip code value in the column, the corresponding data entries in the transformed geographic data 226 will include the geographic centroids 304a-304i (e.g., single-point locations) in place of the zip codes. For those data entries that had a NULL value in the column (if any such data entries existed), the corresponding data entries in the transformed geographic data 226 will include the overall geographic centroid 306 in place of the NULL value.

Figure 4:
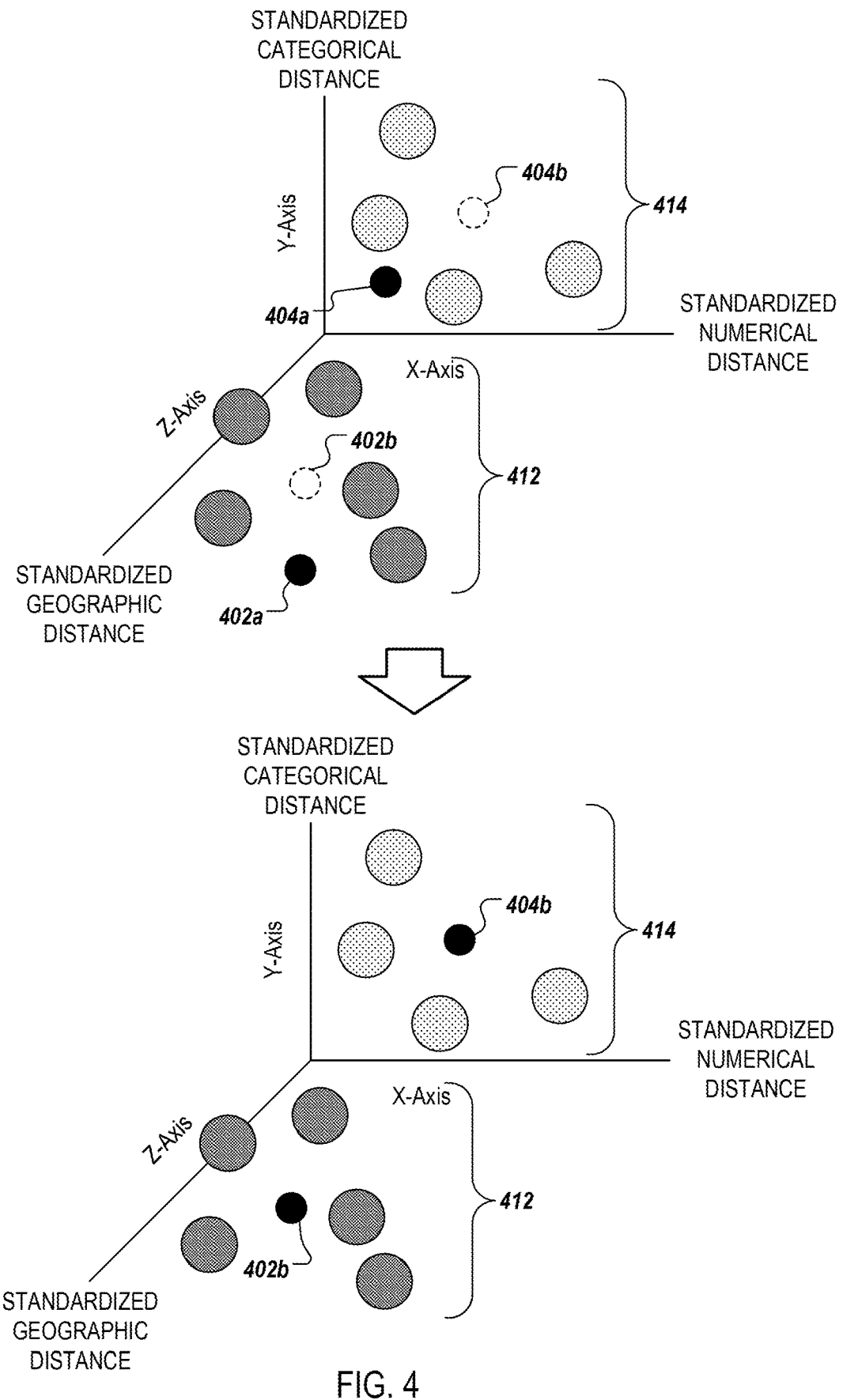
FIG. 4 is an example diagram illustrating updating cluster positions during k-means clustering while supporting geography features.

FIG. 4 is an example diagram illustrating updating cluster positions during k-means clustering while supporting geography features. As shown, a first cluster 412 of data entries has been assigned to a first cluster with the current position 402a, and a second cluster 414 of data entries has been assigned to a second cluster with the current position 404a. The data entries shown are the data entries found in the transformed data which correspond to data entries of the data set 202 shown in FIG. 2. Each of the clusters 412 and 414 (and their data entries) include a standardized numerical distance component, a standardized categorical distance component, and a standardized geographic distance component.

After an iteration of k-means clustering, new cluster positions 402b and 404b are determined for the cluster 412 and the cluster 414 respectively. The position 402b can be determined by cluster iterator 216 determining the geometric center of the data entries in the cluster 412. That is, the cluster iterator 216 can find the average numerical value for those data entries in the cluster 412 from the transformed non-geographic data 228. The average numerical value can serve as the x-axis coordinate for the position 402b. The cluster iterator 216 can find the average categorical value for those data entries in the cluster 412 from the transformed non-geographic data 228. The average categorical value can serve as the y-axis coordinate for the position 402b. The cluster iterator 216 can find the average geographical value for those data entries in the cluster 412 from the transformed geographic data 226. The average geographic value can serve as the z-axis coordinate for the position 402b.

Similarly, the position 404b can be determined by cluster iterator 216 determining the geometric center of the data entries in the cluster 414. That is, the cluster iterator 216 can find the average numerical value for those data entries in the cluster 414 from the transformed non-geographic data 228.

The average numerical value can serve as the x-axis coordinate for the position 404b. The cluster iterator 216 can find the average categorical value for those data entries in the cluster 414 from the transformed non-geographic data 228. The average categorical value can serve as the y-axis coordinate for the position 404b. The cluster iterator 216 can find the average geographical value for those data entries in the cluster 414 from the transformed geographic data 226. The average geographic value can serve as the z-axis coordinate for the position 404b.

The cluster iterator 216 can update the cluster 412 position to the position 402b, and can update the cluster 414 position to the position 404b. The cluster iterator 216 can compare the position 402b with the position 402a, and the position 404b with the position 404a to determine if additional k-means clustering iterations are needed.

Figure 5:
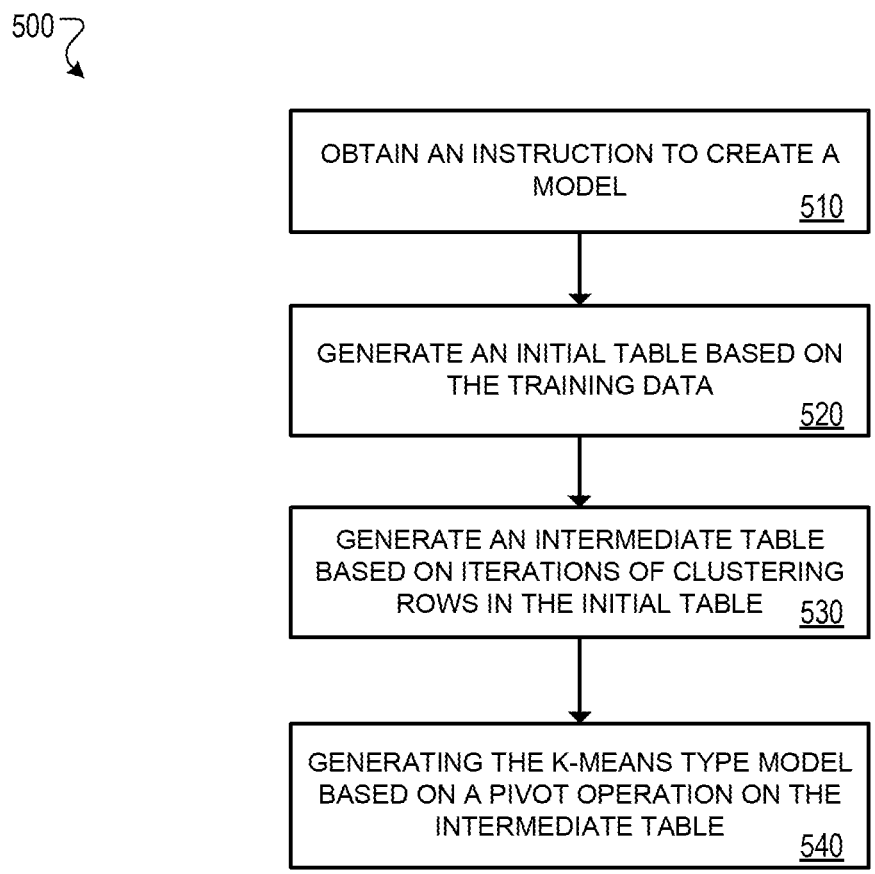
FIG. 5 is a flow diagram that illustrates an example of a process of transformation for creating a machine learning model with k-means clustering.

FIG. 5 is a flow diagram that illustrates an example of a process 500 of transformation for creating a machine learning model with k-means clustering. The process 500 can be performed by the system 100 described above with respect to FIG. 1. The process 500 can be performed by the system 200 described above with respect to FIG. 2. The process 500 may be performed by one or more computing devices, such as the one or more computing devices that implement the initializer 114, the cluster iterator 116, and the pivoter 118. Similarly, the process 600 can be performed by one or more of the statistics module 212, the transform module 214, the cluster iterator 216, and the pivoter 218.

The process 500 includes obtaining an instruction to create a k-means type model with training data (510). For example, the initializer 114 may receive SQL query of "CREATE MODEL my_model OPTIONS (model_type='kmeans', num_clusters=4, max_iterations=15, dist_type=cosine) AS SELECT*FROM data" that specifies to create a k-means model by clustering the training data into four clusters and iteratively clustering fifteen times where the cosine distance of rows is used for clustering.

The process 500 includes generating an initial table based on the training data (520). For example, the initializer 114 may generate an initial table based on clustering the training data into four clusters.

The process includes generating an intermediate table based on clustering rows in the training data based on the initial table (530). For example, the cluster iterator 116 may iterate fifteen times, clustering the training data into four clusters based on the initial table and updating the initial table based on the centroids of the four clusters, and use the resulting initial table as the intermediate table.

The process includes generating the k-means type model based on a pivot operation on the intermediate table (540). For example, the pivoter 118 may receive the intermediate table from the cluster iterator 116 and perform a pivot operation on the intermediate table and use the result as the model.

Figure 6:
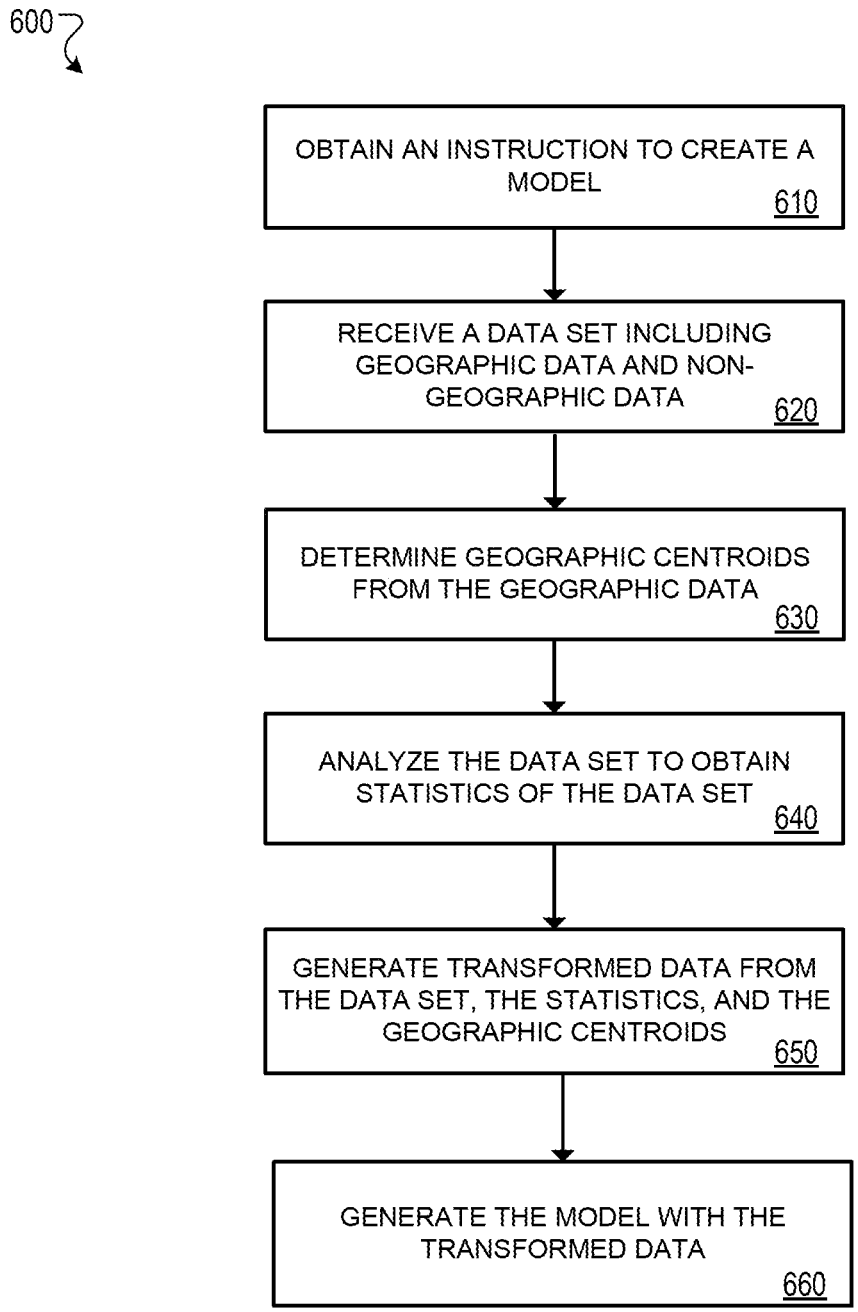
FIG. 6 is a flow diagram that illustrates an example of a process of creating a machine learning model with k-means clustering while supporting geography features.

FIG. 6 is a flow diagram that illustrates an example of a process 600 of creating a machine learning model with k-means clustering while supporting geography features. The process 600 can be performed by the system 100 described above with respect to FIG. 1. The process 600 can be performed by the system 200 described above with respect to FIG. 2. The process 600 may be performed by one or more computing devices, such as the one or more computing devices that implement the initializer 114, the cluster iterator 116, and the pivoter 118. Similarly, the process 600 can be performed by one or more of the statistics module 212, the transform module 214, the cluster iterator 216, and the pivoter 218.

The process 600 includes obtaining an instruction to create a model (610). For example, the instruction can be the instruction to create a model with k-means clustering from the user device 112 shown in FIGS. 1-2. The instruction can indicate all or portions of the data set 202 that is to be used to create the model with k-means clustering.

The process 600 includes receiving a data set including geographic data and non-geographic data (620). For example, the data set can be the data set 202 shown in FIG. 2. The statistics module 212 can receive the data set, e.g., from an SQL server. Receiving the data set can include, for example, importing the data set. For example, the statistics module 212 can import the data set, e.g., from an SQL server based on the instruction to create a model with k-means clustering.

The process 600 includes determining geographic centroids from the geographic data (630). For example, the geographic centroids can be the geographic centroids 220 shown in FIG. 2. The geographic centroids can be determined by the statistics module 212. The geographic centroids can be determined by, for example, the statistics module 212 converting geographic data in the data set 202 to one or more single-point locations with each single-point location corresponding to a single data entry of the data set 202.

The process 600 includes analyzing the data set to obtain statistics of the data set (640). For example, the statistics module 212 shown in FIG. 2 can analyze the data set to determine the geographic data statistics 222 and the non-geographic data statistics 224.

The process 600 includes generating transformed data from the data set, the statistics, and the geographic centroids (650). For example, the transform module 214 shown in FIG. 2 can use the geographic centroids 220 and the geographic data statistics 222 to generate the transformed geographic data 226. Similarly, the transform module 214 can use the non-geographic data statistics 224 to generate the transformed non-geographic data 228.

The process 600 includes generating the model with the transformed data (660). The model can be generated using k-means clustering. For example, the cluster iterator 216 shown in FIG. 2 can be used to generate the geographic model 230 and the non-geographic model 232 based on the transformed geographic data 226 and the transformed non-geographic data 228 respectively. The geographic model 230 and the non-geographic model 232 can be used, e.g., by the pivoter 218, to generate the model 234 to be used during evaluation and prediction. The model can indicate multiple data groupings, e.g., clusters. The geographic model 230, the non-geographic model 232, and/or the model 234 can indicate which clusters the data entries of the transformed data and their corresponding entries in the data set 202 belong to. The geographic model 230, the non-geographic model 232, and/or the model 234 can indicate a range of values and/or average values for each of the data groupings (e.g., clusters). For example, the model 234 can indicate a range of numerical values for numerical data for each of the clusters.

In some implementations, the process 600 includes receiving a second data set that includes second data entries; and using the model to assign the second data entries of the second data set to the data groupings. The system 200 can use the model 234 to analyze the second data set in making a prediction. The second data entries can be added to a training data set (e.g., after being transformed by the transform module 214) and used to update the geographic model 230, the non-geographic model 232, and/or the model 234.

In some implementations, the process 600 includes generating a merged data set from the data set and the second data set; determining geographic centroids from geographic data in the merged data set; analyzing the merged data set to obtain statistics of the merged data set; generating updated transformed data from the merged data set, the statistics, and the geographic centroids; and generating an updated model with the updated transformed data, the updated model indicating multiple data groupings. Here, one or more of the geographic centroids from the geographic data in the merged data set can be different from one or more of the geographic centroids from the geographic data in the data set. For example, the system 200 can use the second data set to update training data for the geographic model 230, the non-geographic model 232, and/or the model 234. Accordingly, centroids for the models' centroids can be updated using the updated training data and additional k-means clustering iterations can optionally be performed by the cluster iterator 216.

In some implementations, obtaining locations for a subset of the data entries from the geographic data, the subset including data entries in the data set having a geographic data component; and determining single-point positions from the locations. Here, the geographic centroids can be the single-point positions. The subset of the data entries can be those data entries in the data set 202 shown in FIG. 2 that do not have a geographic data component, have a geographic data component but are missing a geographic data component that one or more other entries have, and/or have a NULL value for a geographic data component (e.g., a NULL value for a given column of geographic data).

In some implementations, obtaining the locations includes obtaining a geographic area for a data entry in the subset, determining the single-point positions from the locations includes determining a geometric center of the geographic area, and the single-point positions include the geometric center for the geographic area. For example, the geographic area can be the zip code polygon shown in FIG. 3A. The statistics module 212 shown in FIG. 2 can be used to determine the geometric center of the geographic area. The statistics module 212 can add this geometric center to the geographic centroids 220 as a geographic centroid.

In some implementations, obtaining the geographic locations includes obtaining coordinates for a data entry in the subset, determining the single-point positions from the locations includes converting the coordinates to a single-point position for the data entry, and the single-point positions include the single-point position for the data entry. For example, the statistics module 212 shown in FIG. 2 can be used to convert latitude and longitude coordinates of a data entry to a single-point location. The statistics module 212 can add this single-point location to the geographic centroids 220 as a geographic centroid.

In some implementations, analyzing the data set to obtain statistics of the data set includes: determining an overall centroid of the geographic data; determining an overall geographic distance of the geographic centroids from the overall centroid; and determining a variance for the geographic data. For example, the statistics module 212 shown in FIG. 2 can be used to determine the overall geographic centroid 306 shown in FIG. 3B, can be used to determine distances (e.g., geodesic distances) between the geographic centroids 220 and the overall geographic centroid 306 including the distance 314, can average the distances to determine an overall geographic distance, and can use the distance to calculate a standard of deviation and variance of the distances.

In some implementations, determining the overall centroid includes determining a geometric center of the geographic centroids, and the overall centroid is the geometric center of the geographic centroids. For example, the statistics module 212 shown in FIG. 2 can be used to determine the geometric center of the geographic centroids 304a-304i shown in FIG. 3B in determining the overall geographic centroid 306.

In some implementations, determining the overall geographic distance of the geographic centroids from the overall centroid includes: determining geographic distances of the geographic centroids from the overall centroid; and averaging the geographic distances to obtain the overall geographic distance. For example, the statistics module 212 shown in FIG. 2 can be used to determine distances (e.g., geodesic distances) between the geographic centroids 220 and the overall geographic centroid 306 including the distance 314, and can average the distances to determine the overall geographic distance.

In some implementations, determining the variance for the geographic data includes determining a variance of the geographic distances using differences between the geographic distances and the overall geographic distance. For example, the statistics module 212 shown in FIG. 2 can be used to determine distances (e.g., geodesic distances) between the geographic centroids 220 and the overall geographic centroid 306 including the distance 314, and can use the distances and the geographic centroids 220 to determine a standard of deviation of the distances and a variance of the distances.

In some implementations, determining the variance of the geographic distances comprises calculating a standard deviation of the geographic distances. For example, as described above with respect to FIG. 2, the statistics module 212 can use can use the distances between the geographic centroids 220 and an overall centroid (e.g., for a given data column of the data set 202) and the geographic centroids 220 to determine a standard of deviation of the distances and, therefore, a variance of the distances. The statistics module 212 can add the standard of deviation and/or the variance of the distances to the geographic data statistics 222 and can save the geographic data statistics 222.

In some implementations, the overall geographic distance and the geographic distances are geodesic distances along a surface of the earth. For example, the geographic distances can include the geodesic distance 314 shown in FIG. 3B.

In some implementations, generating the transformed geographic data from the data set, the statistics, and the geographic centroids includes: for a first subset of the data entries, adding the geographic centroids to corresponding data entries of the transformed data as at least a portion of the transformed data; and for a second subset of the data entries, adding the overall centroid to corresponding data entries of the transformed data as at least a portion of the transformed data. Here, the first subset can include data entries in the data set having a geographic data component and the second subset can include data entries in the data set that do not have the geographic component. Not having the geographic component can mean that the data entries in the second subset have a NULL value for that geographic component, e.g., they each have a NULL value in a geographic data column of the data set 202 shown in FIG. 2. Not having the geographic component can mean that the data entries in the second subset do not have any geographic data components and/or only have non-geographic data components.

Generating the transformed geographic data can include, for example, the transform module 214 generating the transformed geographic data 226 using the geographic centroids 220 and the geographic data statistics 222. Generating the transformed geographic data can include, for example, the transform module 214 copying the data set 202 and modifying the copy. Generating the transformed geographic data can include, for example, the transform module 214 generating a new data set based on the data set 202.

In some implementations, generating the model with the transformed data includes: determining a number of data groupings; assigning positions to the data groupings; and assigning data entries of the transformed data to the nearest data grouping using the positions. Here, assigning the data entries of the transformed data to the nearest data grouping can include: determining total Euclidean distances between the data entries and the positions, comparing the total Euclidean distances to identify the positions that are nearest the data entries of the transformed data, based on the comparison, assigning the data entries of the transformed data to the data groupings corresponding to the positions that are nearest the data entries of the transformed data. Determining the total Euclidean distances between the data entries and the positions can include determining Euclidean distances for transformed non-geographic data in the transformed data from each of the positions; determining Euclidean distances for transformed geographic data in the transformed data from each of the positions; and aggregating the Euclidean distances for the transformed non-geographic data and the Euclidean distances for the transformed geographic data to obtain the total Euclidean distances.

For example, the cluster iterator 216 shown in FIG. 2 can determine Euclidean distances for the transformed geographic data 226 and Euclidean distances for the transformed non-geographic data 228 while performing k-means clustering. The cluster iterator 216 can use the following formula to aggregate the various Euclidean distances to determine total Euclidean distances:

$$dist_{Euclidean} = \Sigma_i (x_i - y_i)^2 +$$
$$\lambda \sum_j (1.0 - \delta(x_j, y_j)) + \frac{1}{\sigma_{dist}^2} \sum_k (ST\_DISTANCE(x_k, y_k)).$$

This formula is described in more detail above with respect to FIG. 2.

The cluster iterator 216 can determine total Euclidean distances between each data entry in the transformed data and each of the positions of the clusters.

In some implementations, determining the Euclidean distances for the transformed non-geographic data from each of the positions includes: determining Euclidean distances for numerical data components in the transformed non-geographic data from each of the positions; and determining Euclidean distances for categorical data components in the transformed non-geographic data from each of the positions. Here, aggregating the Euclidean distances can include aggregating the Euclidean distances for the numerical data components, the Euclidean distances for the categorical data components, and the Euclidean distances for the transformed geographic data to obtain the total Euclidean distances. For example, the cluster iterator 216 shown in FIG. 2 can be used to calculate a total Euclidean distance that includes a numerical Euclidean distance component, a categorical Euclidean distance component, and a geographic Euclidean distance component.

In some implementations, determining the Euclidean distances for the transformed geographic data from each of the positions includes: determining geographic distances between the geographic centroids and each of the positions; using the statistics to identify a variance of the geographic data; and using the variance to standardize the geographic distances. Here, the Euclidean distances for the transformed geographic data can include the standardized geographic distances. For example, the cluster iterator 216 can determine Euclidean distances for the geographic data (e.g., geographic component of the total Euclidean distances) by determining the distance between the geographic centroids 220 that are made part of the transformed geographic data 226 and cluster positions. These distances can be represented, for example, by the following formula:

$$dist_{Geo\text{-}Euclidean} = \frac{1}{\sigma_{dist}^2} \sum_k (ST\_DISTANCE(x_k, y_k))$$

In some implementations, generating the model with the transformed data includes determining new positions for the data groupings by: for each of the data groupings, determining a geometric center for data entries of the transformed data assigned to the respective data grouping; and assigning the geometric centers to the data groupings as the new positions. Determining the geometric center can includes averaging the Euclidean distances for transformed non-geographic data in the transformed data corresponding to the data entries of the transformed data assigned to the respective data grouping; and averaging the Euclidean distances for transformed geographic data in the transformed data corresponding to the data entries of the transformed data assigned to the respective data grouping. For example, the cluster iterator 216 can use the data entries in the cluster 412 and the data entries in the cluster 414 to update the locations of each of the clusters 412 and 414. For example, the cluster iterator 216 can average the positions of the entries in the cluster 412, e.g., can average the geographical data values of the data entries, the numerical values of the data entries, and the categorical values of the data entries. The cluster iterator 216 can use these averages to update the cluster 412 position from 402a to 402b.

In some implementations, generating the model with the transformed data includes determining an accuracy of the model by: determining that differences between the new positions and the positions meet a first threshold, or determining that an average quantization error for the data entries of the transformed data assigned to the data groupings at the new positions meet a second threshold. For example, the cluster iterator 216 can check the accuracy of the geographic model 230, the non-geographic model 232, and/or the model 234 after ever cluster iteration or after a set number of cluster iterations (e.g., every ten, every hundred, every thousand, etc.).

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing devices 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
 obtaining an instruction to create a model;
 receiving a data set including geographic data and non-geographic data, the data set having multiple data entries;
 determining geographic centroids from the geographic data;
 analyzing the data set to obtain statistics of the data set;
 generating transformed data from the data set, the statistics, and the geographic centroids;
 generating a model with the transformed data, the model indicating multiple data groupings;

receiving a second data set that includes second data entries;

assigning, using the model, the second data entries of the second data set to the multiple data groupings;

generating a merged data set from the data set and the second data set;

determining geographic centroids from geographic data in the merged data set;

analyzing the merged data set to obtain statistics of the merged data set;

generating updated transformed data from the merged data set, the statistics, and the geographic centroids; and generating an updated model with the updated transformed data, the updated model indicating updated multiple data groupings, wherein one or more of the geographic centroids from the geographic data in the merged data set is different from one or more of the geographic centroids from the geographic data in the data set.

2. The method of claim 1, wherein the non-geographic data includes at least one of numerical data and categorical data.

3. The method of claim 1, wherein determining the geographic centroids from the geographic data in the data set comprises:

obtaining locations for a subset of the data entries from the geographic data, the subset including data entries in the data set having a geographic data component; and determining single-point positions from the locations, wherein the geographic centroids are the single-point positions.

4. The method of claim 3, wherein:

obtaining the locations comprises obtaining a geographic area for a data entry in the subset;

determining the single-point positions from the locations comprises determining a geometric center of the geographic area; and the single-point positions include the geometric center for the geographic area.

5. The method of claim 3, wherein:

obtaining the locations comprises obtaining coordinates for a data entry in the subset;

determining the single-point positions from the locations comprises converting the coordinates to a single-point position for the data entry or using the coordinates as the single-point position; and the single-point positions include the single-point position for the data entry.

6. The method of claim 1, wherein analyzing the data set to obtain statistics of the data set comprises:

determining an overall centroid of the geographic data;

determining an overall geographic distance of the geographic centroids from the overall centroid; and determining a variance for the geographic data.

7. The method of claim 6, wherein:

determining the overall centroid comprises determining a geometric center of the geographic centroids; and the overall centroid is the geometric center of the geographic centroids.

8. The method of claim 6, wherein determining the overall geographic distance of the geographic centroids from the overall centroid comprises:

determining geographic distances of the geographic centroids from the overall centroid; and averaging the geographic distances to obtain the overall geographic distance.

9. The method of claim 8, wherein determining the variance for the geographic data comprises determining a variance of the geographic distances using differences between the geographic distances and the overall geographic distance.

10. The method of claim 8, wherein the overall geographic distance and the geographic distances are geodesic distances along a surface of the earth.

11. The method of claim 6, wherein generating the transformed data from the data set, the statistics, and the geographic centroids comprises:

for a first subset of the data entries, adding the geographic centroids to corresponding data entries of the transformed data as at least a portion of the transformed data; and for a second subset of the data entries, adding the overall centroid to corresponding data entries of the transformed data as at least a portion of the transformed data, wherein the first subset includes data entries in the data set having a geographic data component and the second subset includes data entries in the data set that do not have the geographic data component.

12. The method of claim 1, wherein generating the model with the transformed data comprises:

determining a number of the multiple data groupings;

assigning positions to the multiple data groupings; and assigning data entries of the transformed data to a nearest data grouping using the positions, wherein assigning the data entries of the transformed data to the nearest data grouping comprises:

determining total Euclidean distances between the data entries and the positions by:

determining Euclidean distances for transformed non-geographic data in the transformed data from each of the positions;

determining Euclidean distances for transformed geographic data in the transformed data from each of the positions; and aggregating the Euclidean distances for the transformed non-geographic data and the Euclidean distances for the transformed geographic data to obtain the total Euclidean distances;

comparing the total Euclidean distances to identify the positions that are nearest the data entries of the transformed data; and based on the comparison, assigning the data entries of the transformed data to the multiple data groupings corresponding to the positions that are nearest the data entries of the transformed data.

13. The method of claim 12, wherein determining the Euclidean distances for the transformed non-geographic data from each of the positions comprises:

determining Euclidean distances for numerical data components in the transformed non-geographic data from each of the positions; and determining Euclidean distances for categorical data components in the transformed non-geographic data from each of the positions, wherein aggregating the Euclidean distances comprises aggregating the Euclidean distances for the numerical data components, the Euclidean distances for the categorical data components, and the Euclidean distances for the transformed geographic data to obtain the total Euclidean distances.

14. The method of claim 12, wherein determining the Euclidean distances for the transformed geographic data from each of the positions comprises:
- determining geographic distances between the geographic centroids and each of the positions;
- using the statistics to identify a variance of the geographic data; and
- using the variance to standardize the geographic distances, wherein the Euclidean distances for the transformed geographic data include the standardized geographic distances.

15. The method of claim 12, wherein generating the model with the transformed data comprises determining new positions for the multiple data groupings by:
- for each respective data grouping of the multiple data groupings, determining a geometric center for data entries of the transformed data assigned to the respective data grouping; and
- assigning the geometric centers to the multiple data groupings as the new positions,
- wherein determining the geometric center comprises:
  - averaging the Euclidean distances for transformed non-geographic data in the transformed data corresponding to the data entries of the transformed data assigned to the respective data grouping; and
  - averaging the Euclidean distances for transformed geographic data in the transformed data corresponding to the data entries of the transformed data assigned to the respective data grouping.

16. The method of claim 15, wherein generating the model with the transformed data comprises determining an accuracy of the model by:
- determining that differences between the new positions and the positions meet a first threshold; or
- determining that an average quantization error for the data entries of the transformed data assigned to the multiple data groupings at the new positions meet a second threshold.

17. A system comprising:
- one or more computers; and
- one or more computer-readable media storing instructions that, when executed, cause the one or more computers to perform operations comprising:
  - obtaining an instruction to create a model;
  - receiving a data set including geographic data and non-geographic data, the data set having multiple data entries;
  - determining geographic centroids from the geographic data;
  - analyzing the data set to obtain statistics of the data set;
  - generating transformed data from the data set, the statistics, and the geographic centroids;
  - generating a model with the transformed data, the model indicating multiple data groupings;
  - receiving a second data set that includes second data entries;
  - assigning, using the model, the second data entries of the second data set to the multiple data groupings;
  - generating a merged data set from the data set and the second data set
  - determining geographic centroids from geographic data in the merged data set
  - analyzing the merged data set to obtain statistics of the merged data set
  - generating updated transformed data from the merged data set, the statistics, and the geographic centroids; and
  - generating an updated model with the updated transformed data, the updated model indicating updated multiple data groupings,
  - wherein one or more of the geographic centroids from the geographic data in the merged data set is different from one or more of the geographic centroids from the geographic data in the data set.

18. One or more non-transitory computer-readable media storing instructions that, when executed by one or more computers, cause the one or more computers to perform operations comprising:
- obtaining an instruction to create a model;
- receiving a data set including geographic data and non-geographic data, the data set having multiple data entries;
- determining geographic centroids from the geographic data;
- analyzing the data set to obtain statistics of the data set;
- generating transformed data from the data set, the statistics, and the geographic centroids;
- generating a model with the transformed data, the model indicating multiple data groupings;
- receiving a second data set that includes second data entries;
- assigning, using the model, the second data entries of the second data set to the multiple data groupings;
- generating a merged data set from the data set and the second data set;
- determining geographic centroids from geographic data in the merged data set;
- analyzing the merged data set to obtain statistics of the merged data set;
- generating updated transformed data from the merged data set, the statistics, and the geographic centroids; and
- generating an updated model with the updated transformed data, the updated model indicating updated multiple data groupings,
- wherein one or more of the geographic centroids from the geographic data in the merged data set is different from one or more of the geographic centroids from the geographic data in the data set.

* * * * *